United States Patent Office 2,903,418
Patented Sept. 8, 1959

2,903,418

PREPARATION OF ETA ALUMINA BY ACID HYDROLYSIS

Isidor Kirshenbaum, Union, and John A. Hinlicky, Irvington, N.J., assignors to Esso Research and Engineering Company, a corporation of Delaware No Drawing. Application November 3, 1955
Serial No. 544,824

5 Claims. (Cl. 208—138)

This invention relates to the preparation of improved solid catalysts for the conversion of hydrocarbon materials. More particularly it relates to the improved preparation of eta alumina, an exceedingly effective support material for catalysts, especially platinum-containing hydroforming catalysts.

Hydroforming processes are well known at this time and the basic operation of the hydroformer is no part of this invention, e.g., see Petroleum Processing, August 1955, pages 1170 through 1196.

Usually the normally liquid feed stock boils substantially within the range of from about 150° to 430° F. and more particularly 200° to 350° F. The light ends, i. e., the material boiling from about 0° to 200° F., are not subjected to this reaction, for the reason that the virgin naphtha light ends have a fairly good octane rating. The feed or charging stock to the hydroforming reactor can be a virgin naphtha, a cracked naphtha, a coker naphtha, a Fischer-Tropsch naphtha, a mixture of these, or the like.

Hydroforming operations are ordinarily carried out in the presence of hydrogen or hydrogen-rich recycle gas at temperatures of 750° to 1150° F., in a pressure range of about 50 to 1000 pounds per square inch, and in contact with hydroforming catalysts.

The chemical reactions involved in the hydroforming process include dehydrogenation of naphthenes to the corresponding aromatics, isomerization of straight chain paraffins to form branched chain paraffins, isomerization of cyclic compounds such as ethylcyclopentane to form methylcyclohexane, and some aromatization, dealkylation and hydrocracking of paraffins. In a hydroforming operation which is conducted efficiently it is possible with the use of a proper catalyst and proper conditions of operation to hydroform a virgin naphtha to a hydroformate having an octane number of from 95 to 98 and obtain yields of $C_5+$ hydrocarbons as high as 85%.

A particularly useful catalyst for these operations has been found to be platinum supported on an alumina base. For instance, a commonly used composition of such catalyst is one containing from 0.001 to 2.0 weight percent platinum, the remainder being the alumina spacing agent or base.

A particularly suitable form of alumina for use as a support material has been prepared according to the process of U.S. Patent No. 2,636,865. This process comprises reacting aluminum metal with a water-insoluble anhydrous alcohol, hydrolyzing the aluminum alcoholate with water, separating the hydrous alumina from the alcohol, and recovering the alumina from its aqueous slurry. The hydrolysis temperature utilized is in the range of 70° to 200° F., and it supplies an effective catalyst support. The alumina produced thereby, however, has been shown to contain only about 30% eta alumina, with the remainder in the gamma form. Experiments have demonstrated that catalyst activity and activity maintenance are improved as the eta alumina content of the support is increased. This improvement is effected without impairing the selectivity to $C_5+$ product. It is therefore desirable to obtain alumina support materials consisting predominantly of i.e., at least 90 weight percent, eta alumina. In addition the eta alumina produced while satisfactory for fixed bed operation is too soft for fluidized operation at the high feed rates made possible by their activity. It is thus also desirable to produce an eta alumina of increased hardness or attrition resistant qualities.

It has now been found that eta alumina can be formed in quantitative yields, 100% if desired by hydrolyzing the aluminum alcoholate at a pH of 3 to 5 with an aqueous solution of an acid selected from the group consisting of volatile inorganic acids and carboxylic acids having at least 3 carbon atoms. The resultant aqueous slurry of hydrous alumina is then aged for at least 5 hours, then dried and calcined. All of the features are important both singly and in combination. The eta alumina can then be admixed with other catalyst components by means known to the art.

Thus the pH utilized is in the range of 3 to 5. A pH of lower than 3 results in an inadequate production of eta alumina and indeed an amorphous alumina even after prolonged aging. A pH above 5 very deleteriously affects the attrition resistance qualities. This hydrolysis is conducted at a temperature in the range of about 32° to 100° F., preferably below 70° F. The aging is preferably carried out at temperatures in the range of about 60° F. to 100° F., preferably 60° to 80° F. During hydrolysis the aluminum alcoholate solution is added to the acid solution slowly and with adequate stirring and is introduced preferably below the surface of the acid solution.

The volatile inorganic acids that can be used are HCl and $HNO_3$ or mixtures of these in any proportions. Other halogen acids such as HBr can be used, as well as oxygenated halogen acids such as $HClO_3$. The acids can be added as such or formed in situ as by adding chlorine to the aqueous solution to form $HOCl+HCl$. The carboxylic acids that can be used contain at least 3 carbon atoms and are relatively water soluble. Thus $C_3$ to $C_5$ acids are preferred such as propionic, butyric, valeric, lactic, hydracrylic, glyceric, levulinic and the like. The use of higher homologues is limited by water solubility but water-soluble derivatives such as hydroxy acids can be used for higher acids. Polycarboxylic acids can be used. The preferred acids in this case are malonic and glutaric acids because of their greater solubilities. Succinic, pimelic and citric are other examples. Examples of other acids that are useful are soluble mono- or polycarboxylic acids which contain halogen, nitro, or hydroxy groups such as $\alpha$ or $\beta$-chloropropionic acid, tartaric acid, etc. Unsaturated acids are generally less useful. Acid anhydrides, acid (acyl) halides, and esters which form corresponding acids when contacted with water can be substituted for any of the above acids.

Data demonstrate that treatment with acetic or formic acids under identical conditions do not yield catalyst supporting materials consisting predominantly of eta alumina.

It is also necessary that the slurry of crystalline alumina produced be aged for at least 5 hours and preferably 5 to 18 hours while contained in the aqueous phase. Data demonstrate that predominantly eta alumina is not produced without this minimum aging. The latter is conducted at a temperature in the range of 60° to 100° F., preferably 60° to 80° F. The alumina slurry in which the alumina is in the beta trihydrate form is then preferably first dried at a temperature in the range of 200° to 400° F. or higher to remove the aqueous medium and any volatile acids in which it is contained and recover the alumina. Crystalline eta alumina is formed by further dehydrating the beta alumina trihydrate. It has been found that this conversion is essentially quantitative when the activating temperature is in the range of 400° to 1500° F., preferably 1100° to 1450° F. The activation is generally in the presence of air, but can be done in vacuum or other inert gases. Because of the aforementioned transformation of beta trihydrate to eta alumina, this can also be used to indicate the amount of eta phase in the alumina made by activating the product of the hydrolysis.

This calcination or activation treatment can alternatively follow the addition of the catalyst component where the combined catalyst is heated in the same temperature range. This is explained in further detail below. In a similar manner the active catalytic component can be added to the base either before or after the latter is dried.

The preparation of aluminum alcoholates used is no part of this invention but is supplied for completeness. Metallic aluminum is first reacted with an alcohol to form aluminum alcoholate. The alcohol must be essentially anhydrous. Alcohols that can be used include propyl, isopropyl, n-butyl alcohol, secondary butyl alcohol, isobutyl alcohol, pentanol-1, pentanol-2, 3-methyl butanol-1, 2-methyl butanol-3, pentanol-3, hexanol-1, hexanol-2, hexanol-3, the various methyl pentanols, the various dimethyl butanols, the various heptyl alcohols, the various octyl alcohols, etc., including those higher alcohols liquid at the temperature of operation of the process. Ethyl alcohol may be used, but in this case, the slurry after hydrolysis must be dried to remove ethyl alcohol before impregnation with platinum. Instead of using any one of the alcohols singly, mixed alcohols such as mixed amyl alcohols may be used. Mixtures of alcohols of different molecular weights can also be used.

In general, it is preferred to utilize water-immiscible alcohols, i.e., $C_5$ and higher, since this facilitates the recovery of the alcohol in anhydrous form for reuse in the preparation of aluminum alcoholate. In order to further facilitate the separation of the alcohol from the water when using a water-insoluble alcohol, a hydrocarbon, such as a petroleum distillate boiling within the range of 200° to 500° F. or higher, preferably of narrow boiling range which includes the boiling range of the alcohol used, may be added to the alcohol. Instead of using a hydrocarbon fraction, selected hydrocarbons such as heptane, octane, toluene, xylene, etc., may be used.

The metallic aluminum in the form of chips, shot, turnings, ingots or the like is reacted with the alcohol, preferably in the presence of a hydrocarbon diluent and in the presence of a suitable catalyst such as mercuric chloride or other mercury salts, iodine, aluminum halides, or the like. The formation of the alcoholate takes place in accordance with the following equation:

$$6ROH + 2Al \rightarrow 2Al(OR)_3 + 3H_2$$

The hydrogen is in the gaseous state and escapes from the reaction mixture.

When using water-insoluble alcohols, the alcohol which is reformed or regenerated by the hydrolysis step together with the hydrocarbon diluent forms a layer separate and distinct from the slurry of hydrous aluminum oxide and is easily recovered and removed by a simple process of decanting or the like.

When using a water-soluble alcohol for reacting with aluminum to form the alcoholate, the alcohol reformed upon hydrolysis of the alcoholate goes into solution in the water and can be recovered by distillation. The recovered alcohol must then be dehydrated to anhydrous form in the known manner before it is again used for reaction with additional metallic aluminum.

The eta alumina produced can then be converted into a useful hydroforming or aromatization or hydrocracking or desulfurization or hydrofinishing catalyst by the addition of molybdenum oxide, nickel oxide, tungsten oxide or chromium oxide, or metallic salts of molybdic  acid such as calcium molybdate or cobalt molybdate or preferably precious metals such as platinum or palladium. Catalysts useful in isomerization can be made by the addition of nickel or platinum. Catalysts useful in hydration can be made by the addition of tungsten oxide. The incorporation of the catalytic component can be effected in any of a variety of ways well known to the art. For example, molybdenum oxide can be incorporated by slurrying molybdenum oxide with the hydrous alumina or the latter can be dried and the molybdenum oxide sublimed thereon. Alternatively the molybdenum oxide can be incorporated by treating the alumina with ammonium molybdate. It is necessary, however, that the beta trihydrate or the eta form of alumina be formed before the ammonium molybdate or other dehydrogenation compounds are added.

The amount of catalytic component added can be varied, depending to a large degree upon the particular material used. For the most part the catalytic metal oxides or metallic salts of molybdic acid are applied in sufficient amount to give from about 5 to 20 weight percent of the said component in the final composite, although in the case of chromium oxide as much as 40 wt. percent may be incorporated. In the case of the precious metal catalysts about 0.001 to 2.0 weight percent of platinum or about 0.5 to 5.0 weight percent of palladium will suffice to give a catalyst of the desired activity. The dehydrogenating or active catalytic component can be added to the base either before or after the latter is dried, as explained before. Alternatively, the active component can be added to the base in higher concentration and then diluted with unimpregnated base to the desired concentration in a so called "dry mix" technique. It is ordinarily preferred to subject the catalyst to a calcination treatment or heating to temperatures of up to about 1250° F. or higher prior to use in a reforming or hydroforming process. For platinum catalysts minimum temperatures of 800° F. are preferred.

Because of the marked superiority of eta alumina as a support for platinum catalysts, more detailed information is supplied on the preparation of these materials.

The platinum is impregnated on the alumina support by means known in the art. One of the better means involves treatment of the eta alumina support of this invention in the hydrous, dried or calcined form with aqueous cold or hot (0–212° F.) solutions of water-soluble inorganic platinum-containing compounds. The term "water-soluble" also includes platinum-containing compounds which form colloidal solutions. An alternate means involves treatment of the eta alumina support with a solution which contains chloroplatinic acid in ammonium polysulfide. Typical of the water-soluble inorganic platinum-containing compounds which are preferred are chloroplatinic acid, ammonium platinum chloride, dinitrito-dichloro-diammino-platinum, tetrammino platino chloride, trimethyl benzyl ammonium platinum chloride, dichloro-diammino platinum, ammonium platino-nitrite, dinitrito-dibromo-di-ammino-platinum, tetrammino-platinous chloroplatinite, and dinitrito-diammino-platinum. In the case of dinitrito-diammino-platinum, more familiarly known as "P" salt, it is preferred to use an ammoniacal solution. A conveniently used aqueous platinum solution is one containing 15 grams of $H_2PtCl_6 \cdot xH_2O$ (40% Pt) per liter. This strength can be employed to yield catalysts containing about 0.5% platinum; lower or higher concentrations are employed when it is desired to alter the platinum content of the final catalyst. The gross amount of solution utilized is preferably that required to impregnate with the desired amount of platinum by just wetting the total alumina. The alumina support in the platinum solution is heated to dryness, conveniently at temperatures of about 100° to 600° F. at atmospheric pressure, which results in removal of a substantial portion of the water.

The final step in the preparation involves the subjection of the dried catalyst to a reduction step. This reducing step can be carried out by means known in the art, such as hydrogenation and treatment with chemical reducing agents. Typical of these reduction operations is treatment with hydrogen at 200° to 1000° F. with hydrogenation pressures of atmospheric to 1000 pounds p.s.i.g. The catalyst is preferably calcined after the drying step and before the reduction step. Calcining can be carried out at temperatures of the order of about 1100° F., e.g., 800° to 1250° F. Both types of operations are preferably carried out slowly, for example, over the course of about 1 to 24 hours.

This invention will be better understood by reference to the following examples of the preparation and the advantages of the catalyst of this invention.

EXAMPLE 1

Aliquot samples of an aluminum amyl alcoholate were hydrolyzed using different materials indicated below. The pH of the aqueous acetic acid was 2.2 and the aqueous ammonium was 10.5. Aqueous ammonium is known to produce 100% eta aluminum. The resultant slurries were aged, dried, and calcined in the same manner according to the teachings of this invention and catalysts were prepared therefrom containing 0.6 wt. percent platinum. The results of the tests of these catalysts are shown in the following table.

Table I
EFFECT OF ACETIC ACID HYDROLYSIS

| Catalyst | I | II | III |
|---|---|---|---|
| Hydrolysis Medium | Acetic Acid | Water | Aqueous Ammonia. |
| Percent Beta Trihydrate | None (Amorphous). | 98.5 | 100. |
| Character of Al₂O₃ Slurry | Sol | Crystalline | Crystalline. |
| Relative Activity (Percent of Ref.) | 102 | 164 | 180. |
| Res. Octane Number | 91.5 | 94.5 | 95.5. |

These data demonstrate that the acetic acid hydrolysis gave a low activity catalyst without the preferred eta alumina precursor.

The research octane numbers were obtained in the hydroforming of a Coastal virgin naphtha feed of 50 octane number boiling in the range of 200° to 330° F. The conditions were 200 p.s.i.g., 900° F., 6/1 hydrogen-hydrocarbon ratio and 4 wt./hr./wt. The relative activity (percent of reference) of a catalyst is defined as the ratio of the space velocity used with the unknown catalyst to the space velocity required by a standard catalyst to obtain the same octane number at constant temperature.

EXAMPLE 2

Aliquot samples of an aluminum amyl alcoholate were hydrolyzed with different materials at different pH's as shown in the table below. The aging, drying and calcining were similar.

Table II
EFFECT OF pH

| Hydrolysis Catalyst | HCl | | | HNO₃ | None (Control) | NH₄OH | Acetic Acid |
|---|---|---|---|---|---|---|---|
| pH of Hydrolysis Water | 2.5 | 3 | 5 | 2.6 | 7 | 10.5 | 2.2 |
| Percent Beta Trihydrate after 13 hrs. of Aging | 82 | 92 | 100 | 84 | 98.5 | 100 | 0 |

These data demonstrate that at a pH of below 3 a support catalyst consisting predominantly of eta alumina is not obtained. Conversely the table below demonstrates that at a pH of above 5 the attrition resistance is unsatisfactory.

Table III
ATTRITION RESISTANCE

| Catalyst | This Invention | | Control | |
|---|---|---|---|---|
| HCl Hydrolysis | Yes | | No Acid | |
| pH | 3 | 5 | 7 | 10.5 |
| Percent Beta Trihydrate | 92 | 100 | 60 | 100 |
| Attrition Resistance by Roller Test [1] | 4.4 | 4.6 | 8.7 | 13.4 |
| Relative Hydroforming Activity | 150 | 180 | 100 | 180 |

[1] The lower the number the more attrition resistant the alumina.

This table demonstrates how attrition resistance of 2 to 3 times greater is obtained at pH's of 3 to 5 as compared to 7 to 10.5. It should be noted that the high attrition resistance is obtained with high activity. Hydrolysis with NH₄OH to form eta alumina did not result in the high attrition resistance.

EXAMPLE 3

Aliquot samples of an aluminum amyl alcoholate were hydrolyzed at pH's of 3 to 5 with an inorganic mineral acid and then aged as taught. The data demonstrated that a minimum of 5 hours was required to obtain alumina consisting predominantly of eta alumina. The increase in the amount of eta alumina after 18 hours was rather slight.

EXAMPLE 4

Aliquot samples of an aluminum amyl alcoholate were hydrolyzed at about the same pH's with HCl and formic acid and then processed in a similar manner. The results follow:

Table IV

| | Comparison of Formic Acid with HCl Hydrolysis | |
|---|---|---|
| Acid | HCl | Formic |
| pH | 3 | 2.9 |
| Percent Beta Trihydrate after 18 hours aging | 92 | 74 |

These data demonstrate that formic acid does not produce a satisfactory product. On the other hand a similar test made with propionic acid after 18 hours' aging gave a percent beta trihydrate of 91% demonstrating the importance of using a carboxylic acid having at least 3 carbon atoms.

The catalysts of this invention are adapted for use in hydroforming, hydrogenation, hydrocracking, cracking and other reactions known to those in the art. These catalysts are especially useful for the production of aromatics from naphthenes and for the cyclization-dehydrogenation and isomerization of paraffins and olefins.

The method of this invention is applicable to the preparation of pilled, powdered, extruded, etc., catalysts.

The specific names of the crystal modifications of alumina and the alumina hydrates now commonly accepted in the literature and used here are described in detail in an article by H. C. Stumpf et al. of the Aluminum Company of America, in Industrial and Engineering Chemistry, volume 42, page 1398, July 1950.

The increased attrition resistance of the eta alumina prepared by the method of this invention is believed to be due to the relationship between the pore size and the crystalline structure of the material which differs from the eta alumina prepared by other means. The product obtained is thus also different.

It is to be understood that this invention is not limited by theory or the specific examples, which have been offered merely as illustrations, and that modifications may be made without departing from the spirit of the invention.

What is claimed is:

1. A method of preparing attrition resistant alumina especially adapted for use as a catalyst support and consisting predominantly of eta alumina which comprises the steps of hydrolyzing an aluminum alcoholate at a pH in the range of 3 to 5 with an aqueous solution of a halogen acid; aging the resultant alumina precipitate contained as an aqueous slurry of hydrous alumina for a period of time in the range of 5 to 18 hours; drying the alumina slurry to remove the aqueous medium and recover the alumina and heating the alumina to a temperature in the range of about 400° to 1500° F.

2. The process of claim 1 in which the aluminum alcoholate is derived from a $C_5$ and higher alcohol.

3. The process of claim 2 in which the hydrolysis step is conducted at a temperature in the range of 32° to 100° F. and the aging step is conducted at a temperature in the range of 60° to 100° F.

4. An attrition resistant eta alumina especially adapted for use as a catalyst support, said eta alumina being prepared by the process which comprises the steps of hydrolyzing an aluminum alcoholate at a pH in the range of 3 to 5 with an aqueous solution of a halogen acid; aging the resultant alumina precipitate contained as an aqueous slurry of hydrous alumina for at least 5 hours; drying the alumina slurry to remove the aqueous medium and recover the alumina and heating the alumina to a temperature in the range of about 400° to 1500° F.

5. In a process for hydroforming hydrocarbons at elevated temperatures and pressures utilizing a platinum catalyst on an alumina carrier the improvement which comprises utilizing as the carrier, alumina consisting predominantly of attrition resistant eta alumina prepared by the process which comprises the steps of hydrolyzing an aluminum alcoholate at a pH in the range of 3 to 5 with an aqueous solution of a halogen acid; aging the resultant alumina precipitate contained as an aqueous slurry of hydrous alumina for at least 5 hours; drying the alumina slurry to remove the aqueous medium and recover the alumina and heating the alumina to a temperature in the range of about 400° to 1500° F.

References Cited in the file of this patent

UNITED STATES PATENTS

| | | |
|---|---|---|
| 2,656,321 | Hunter et al. | Oct. 20, 1953 |
| 2,658,028 | Haensel et al. | Nov. 3, 1953 |
| 2,746,909 | Hemminger | May 22, 1956 |
| 2,762,782 | Kimberlin et al. | Sept. 11, 1956 |
| 2,773,841 | Kimberlin et al. | Dec. 11, 1956 |
| 2,796,326 | Kimberlin et al. | June 18, 1957 |